Patented Oct. 24, 1944

2,360,895

UNITED STATES PATENT OFFICE 2,360,895

SOFTENERS FOR SYNTHETIC RUBBER

Donald V. Sarbach, Cuyahoga Falls, Ohio, assignor to The B. F. Goodrich Company, New York, N. Y., a corporation of New York No Drawing. Application August 28, 1941, Serial No. 408,659

7 Claims. (Cl. 260—36)

This invention relates to a new class of softeners for synthetic rubber and to the improved compositions obtainable by the use of such softeners.

In comparison to natural rubber, synthetic rubber is relatively hard, dry and non-tacky and unlike natural rubber, is incapable of being masticated to a soft, plastic condition in which it may readily be compounded and processed. Accordingly, it is necessary to employ softeners or plasticizers in order to improve its compounding and processing characteristics. The selection of suitable softeners for synthetic rubber has, however, presented numerous difficulties particularly in the case of synthetic rubber of the type prepared by the copolymerization of a butadiene-1,3 hydrocarbon and an acrylic nitrile. These difficulties are accentuated by the fact that many softeners ordinarily employed as rubbery or resinous materials are absolutely incompatible with this and other types of synthetic rubber and by the further fact that softeners for one type of synthetic rubber do not in all cases function similarly in other types of synthetic rubber. Even varying the proportions of the monomers in the mixtures employed to form copolymers often necessitates the search for new softeners for the synthetic rubber product. Aside from these difficulties some softeners which are compatible with synthetic rubber so adversely affect the properties of vulcanizates prepared from compositions containing them as to preclude their use.

I have now discovered a new class of softeners for any of the synthetic rubbers prepared by the polymerization of a butadiene-1,3 hydrocarbon either alone or in admixture with one or more other polymerizable compounds. These new softeners improve the processing characteristics of unvulcanized synthetic rubber compositions and also enable vulcanizates of excellent physical properties to be produced.

This new class of softeners comprises diesters of polyalkylene glycols with aliphatic monocarboxylic acids containing from 3 to 8 carbon atoms, inclusive, and may be represented by the structural formula

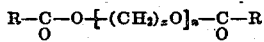

wherein $x$ and $n$ are both integers greater than one and R is an alkyl group containing from 2 to 7 carbon atoms, inclusive. Included in this class are the diesters prepared by the esterification of such alkylene glycols as diethylene glycol, dipropylene glycol, dibutylene glycol, triethylene glycol, tetraethylene glycol, pentaethylene glycol or the like with such saturated aliphatic monocarboxylic acids containing from 3 to 8 carbon atoms as n-propionic acid, isopropionic acid, n-butyric acid, isobutyric acid, n-valeric acid, isovaleric acid, n-hexoic or n-caproic acid, isohexoic acid (4-methyl pentanoic acid), n-heptoic acid, n-caprylic acid, 2-ethyl hexoic acid and the like. Esters in which the two hydroxyl groups of the polyethylene glycol are esterified with the same acid as, for example, diethylene glycol dipropionate as well as mixed esters in which the two hydroxyl groups are esterified with different acids as, for example, diethylene glycol propionate-butyrate are included in this class. The diesters of polyethylene glycol with aliphatic monocarboxylic acids containing from 3 to 8 carbon atoms such as triethylene glycol di-isohexoate, triethylene glycol di-isobutyrate triethylene glycol di-2-ethyl hexoate and the like have been found to be particularly effective.

As mentioned hereinabove these esters may be employed as softeners for synthetic rubber prepared by the polymerization of a butadiene-1,3 hydrocarbon, by which is meant butadiene-1,3 and its homologs which polymerize in essentially the same manner such as isoprene, 2,3-dimethyl butadiene-1,3, piperylene, etc., either alone or in admixture with other butadiene-1,3 hydrocarbons or with other unsaturated monomers copolymerizable therewith. Among such unsaturated monomers copolymerizable with a butadiene-1,3 hydrocarbon to form synthetic rubber there may be mentioned the aryl olefins such as styrene and vinyl naphthalene, the alpha methylene carboxylic acids, esters, nitriles and amides such as acrylic acid, methyl acrylate, methyl methacrylate, acrylonitrile, methacrylonitrile, methacrylamide and the like, isobutylene, methyl vinyl ether, methyl vinyl ketone, vinylidene chloride and other unsaturated hydrocarbons, esters, alcohols, acids, ethers, etc., which contain the polymerizable structure

where at least one of the disconnected valences is attached to an electro-active group, that is, a group which substantially increases the electrical dissymmetry or polar character of the molecule. The polymerization to form a synthetic rubber may be accomplished by any of the well known methods such as homogenous polymerization, polymerization in aqueous emulsion, etc.

The incorporation of the softener with the synthetic rubber may be effected by any desired method as by adding the softener to synthetic rubber while the rubber is being worked on a roll mill, masticating a mixture of the rubber and softener in an internal mixer such as a Banbury type mixer, adding the softener to an emulsion or dispersion of the synthetic rubber or by adding the softener to a solution of the rubber in a solvent. The amount of the softener added will depend upon the properties desired in the composition and upon the nature of the rubber treated, the rubber and the softener being compatible over a wide range of proportions. In commercial operations it will ordinarily be expedient to employ from about 10 to 60 parts by weight of the softener for each 100 parts of synthetic rubber but amounts smaller or larger than this are also effective. With synthetic rubber prepared by the copolymerization of butadiene and styrene or of butadiene and acrylic esters it is possible to use smaller amounts of softener than are required with rubber prepared by the copolymerization of butadiene and an acrylic nitrile.

In a specific example of this invention a softened synthetic rubber composition is prepared by incorporating on a roll mill 50 parts by weight of triethylene glycol di-isohexoate in 100 parts by weight of a synthetic rubber prepared by the copolymerization in aqueous emulsion of 55 parts by weight of butadiene and 45 parts by weight of acrylonitrile. The softener adds quite rapidly to the rubber to produce an exceptionally soft plastic stock. The addition is complete in only 10 minutes as compared to 24 minutes required with an equal amount of dibutyl phthalate, an efficient softener, and the Goodrich plasticity of the resulting stock with a 10 lb. weight at 100° C. is 25.3 as compared to a plasticity of 16.4 obtainable with dibutyl phthalate. The composition is also quite tacky and may be even further tackified by being brushed with an organic solvent such as acetone, ethyl acetate, methyl ethyl ketone, chlorotoluene or the like.

When the above composition is mixed with the conventional compounding ingredients including carbon black, sulfur and a vulcanization accelerator, and then vulcanized, a vulcanizate having especially desirable properties is obtained. Thus, in addition to possessing desirable tensile strength and elongation, the vulcanizate has a low durometer hardness and a high rebound elasticity, both of which properties are particularly valuable. The softener does not appreciably leach out of the vulcanized composition even when it is immersed in hexane for 48 hours, and the composition retains the excellent oil resistance of an unsoftened butadiene acrylonitrile copolymer.

In another embodiment of this invention 10 parts of triethylene glycol di-isohexoate are added on a roll mill to 100 parts of synthetic rubber prepared by copolymerizing in aqueous emulsion 75 parts by weight of butadiene and 25 parts by weight of styrene. The softener adds rapidly to the synthetic rubber to produce a soft plastic unvulcanized stock which may be processed readily either cold or hot. This stock is much more plastic than a heat softened butadiene styrene copolymer and is even more plastic than stocks obtained by the addition of such softeners as pine tar, coal tar of dibutyl phthalate. When this softened composition is mixed with the ordinary compounding and vulcanizing ingredients, and then vulcanized an exceptionally good vulcanizate is obtained. For example, the vulcanizate possesses a tensile strength about 1000 lbs./sq. in. higher than that shown by compositions containing other softeners including coal tar, pine tar and dibutyl phthalate, and is almost equal in tensile to a vulcanizate prepared from the unsoftened rubber. This is a very surprising result since it is ordinarily difficult to employ softeners with this type rubber without seriously impairing the tensile strength of the vulcanizate. The vulcanizate also possesses a low durometer hardness and a high rebound elasticity.

It is to be understood that the above examples have been given by way of illustration only and are not intended to limit this invention in any respect. Other softeners in this class may be incorporated into other synthetic rubbers prepared by the polymerization of a butadiene hydrocarbon to produce excellent unvulcanized and vulcanized compositions. Other materials such as natural rubber, other softeners, pigments, fillers, vulcanizing agents, accelerators, antioxidants and the like may be included in the compositions herein described. Other modifications which will be apparent to those skilled in the art are also within the spirit and scope of the invention as defined by the appended claims.

I claim:

1. A composition of matter comprising a synthetic rubber prepared by the copolymerization of a butadiene-1,3 hydrocarbon and at least one other unsaturated compound which contains a

group and is copolymerizable therewith and, as a softener therefor, a diester of a polyalkylene glycol with an aliphatic monocarboxylic acid containing from 3 to 8 carbon atoms, inclusive.

2. A composition of matter comprising a synthetic rubber prepared by copolymerizing in aqueous emulsion butadiene-1,3 and acrylonitrile and, as a softener therefor, a diester of a polyethylene glycol with an aliphatic monocarboxylic acid containing from 3 to 8 carbon atoms, inclusive.

3. A composition of matter comprising a synthetic rubber prepared by copolymerizing in aqueous emulsion butadiene-1,3 and styrene and, as a softener therefor, a diester of a polyethylene glycol with an aliphatic monocarboxylic acid containing from 3 to 8 carbon atoms, inclusive.

4. The composition of claim 1 wherein the softener is triethylene glycol di-isohexoate.

5. The composition of claim 2 wherein the softener is triethylene glycol di-isohexoate.

6. The composition of claim 3 wherein the softener is triethylene glycol di-isohexoate.

7. A vulcanized synthetic rubber composition comprising a copolymer of a butadiene-1,3 hydrocarbon and at least one other unsaturated compound which contains a

group and is copolymerizable therewith and, as a softener therefor, a diester of a polyalkylene glycol with an aliphatic monocarboxylic acid containing from 3 to 8 carbon atoms, inclusive.

DONALD V. SARBACH.